United States Patent [19]
Hamrick et al.

[11] 3,811,542
[45] May 21, 1974

[54] BAND BRAKE AND METHOD FOR MAKING SAME

[75] Inventors: Oscar Hamrick, Elmwood; Orville E. Kessinger, Jr., Mackinaw, both of Ill.

[73] Assignee: Caterpillar Tractor Co., Peoria, Ill.

[22] Filed: Nov. 6, 1972

[21] Appl. No.: 304,083

[52] U.S. Cl............ 188/259, 188/250 H, 192/107 T
[51] Int. Cl............................................. F16d 69/00
[58] Field of Search...... 188/77 R, 249, 259, 250 H; 192/80, 107 T

[56] References Cited
UNITED STATES PATENTS

| | | | |
|---|---|---|---|
| 3,367,466 | 2/1968 | Lang | 188/259 X |
| 3,399,749 | 9/1968 | Baule | 192/107 T X |
| 1,483,259 | 2/1924 | Wyland | 188/259 |
| 1,526,277 | 2/1925 | Gillet | 188/259 |
| 1,857,125 | 5/1932 | Brackett | 188/259 |
| 2,692,663 | 10/1954 | Reed et al. | 188/259 |

Primary Examiner—George E. A. Halvosa
Attorney, Agent, or Firm—Phillips, Moore, Weissenberger Lempio & Strabala

[57] ABSTRACT

A band brake comprises a one piece flexible band having an anchor formed on each end thereof by reverse folding integral extensions of the band. The band is stretch-formed to its desired diameter on a like configured die member and a segmented brake lining is secured to inner surface portions thereof.

5 Claims, 15 Drawing Figures

PATENTED MAY 21 1974 3,811,542

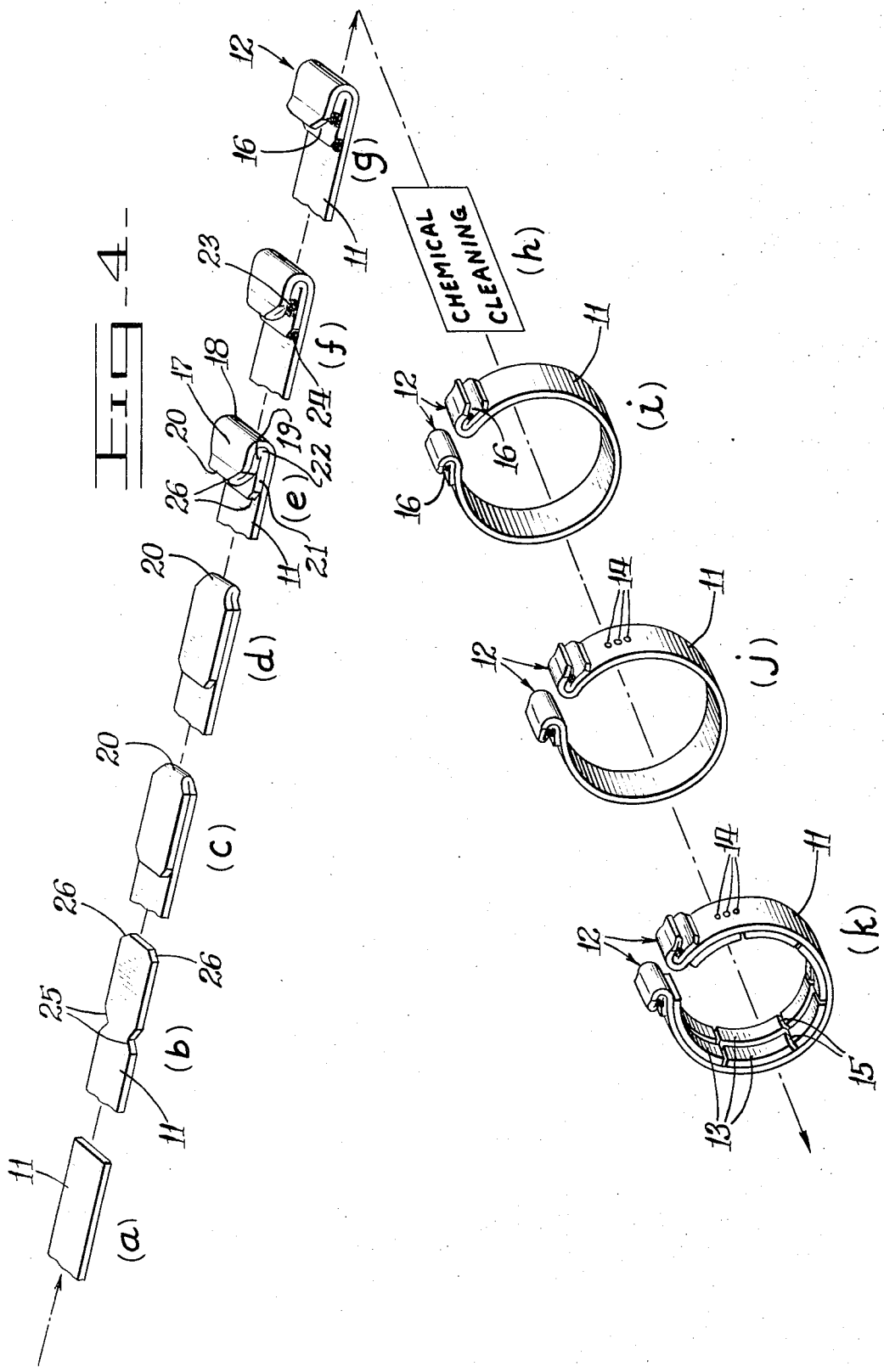

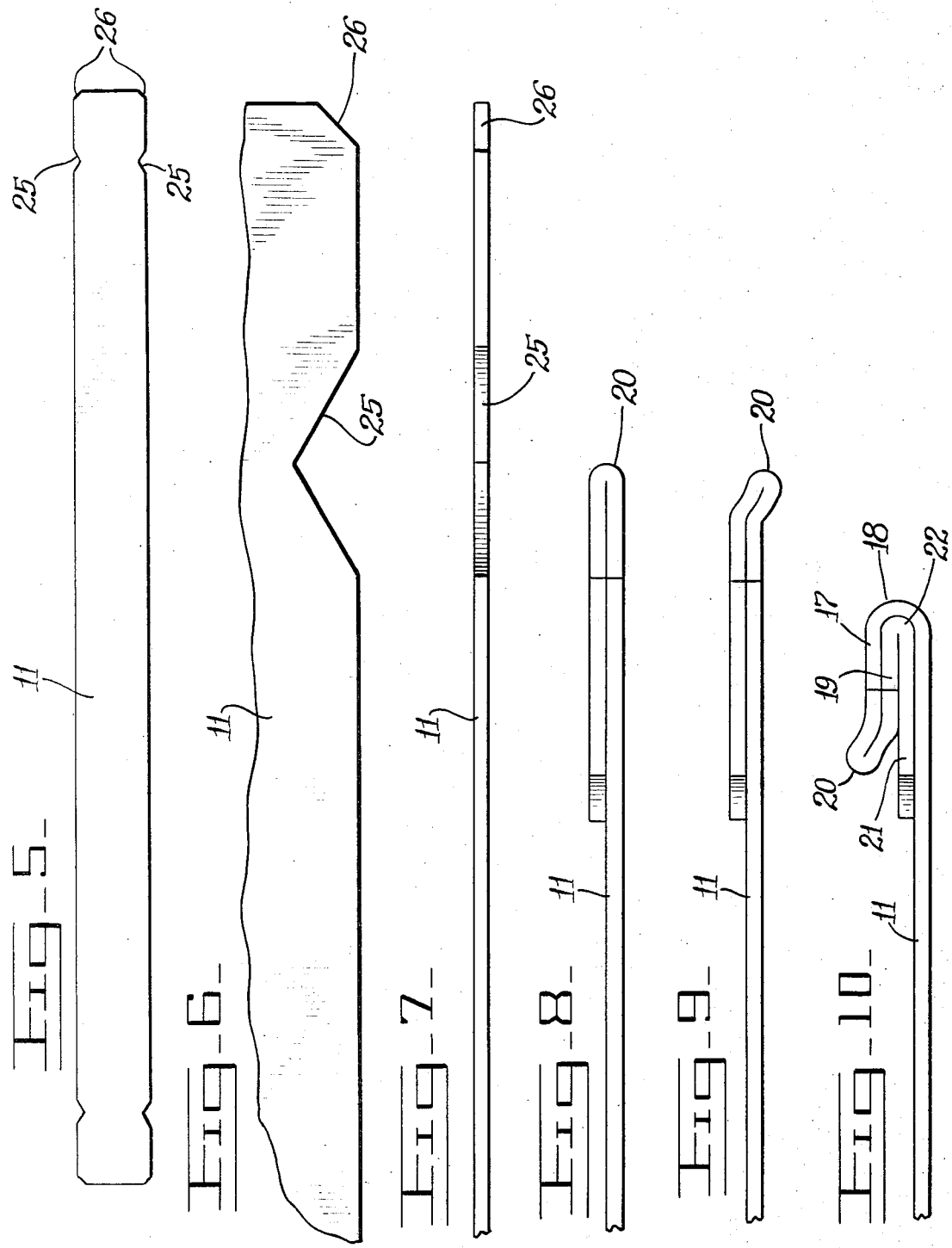

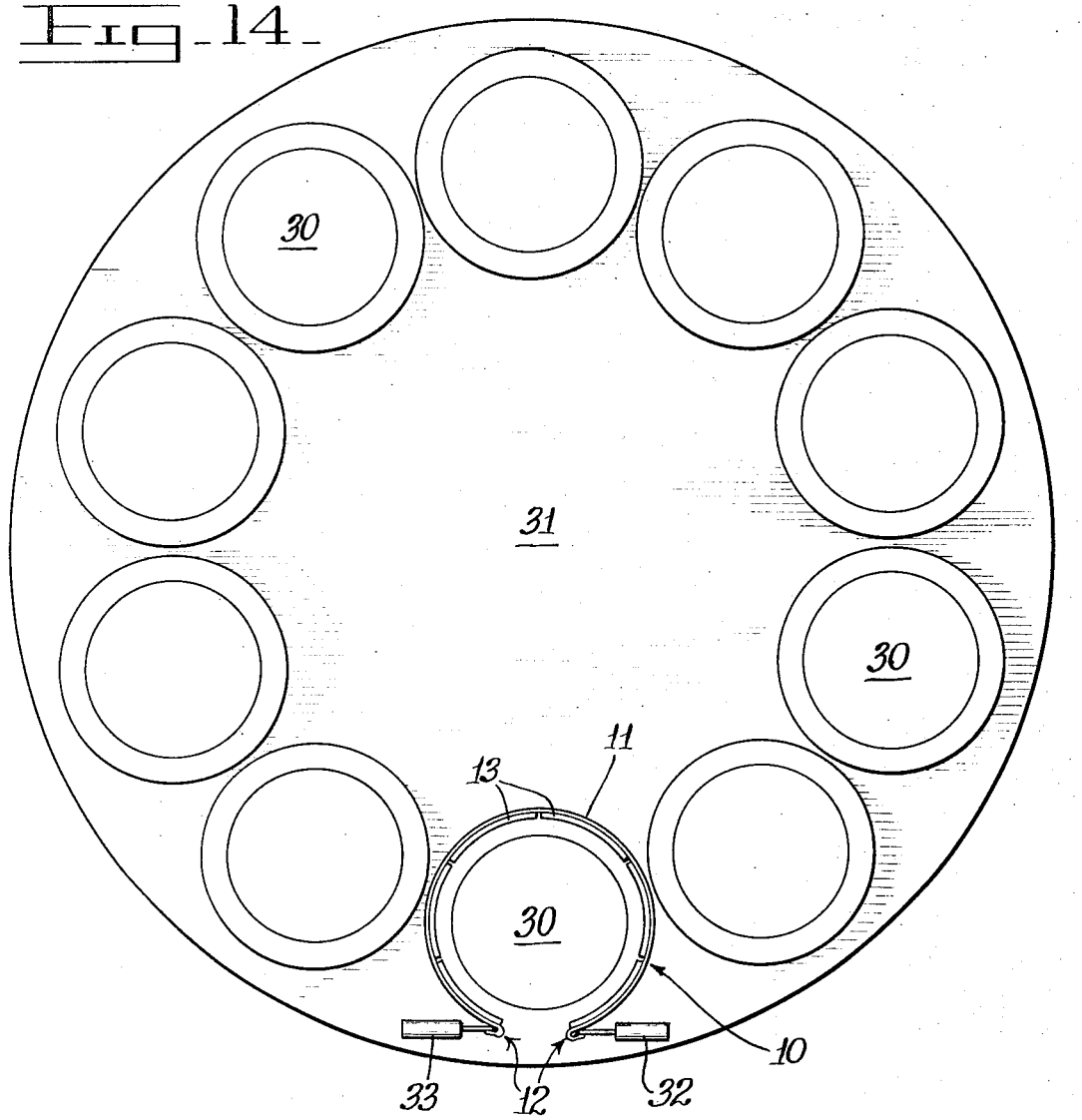
Fig_14_
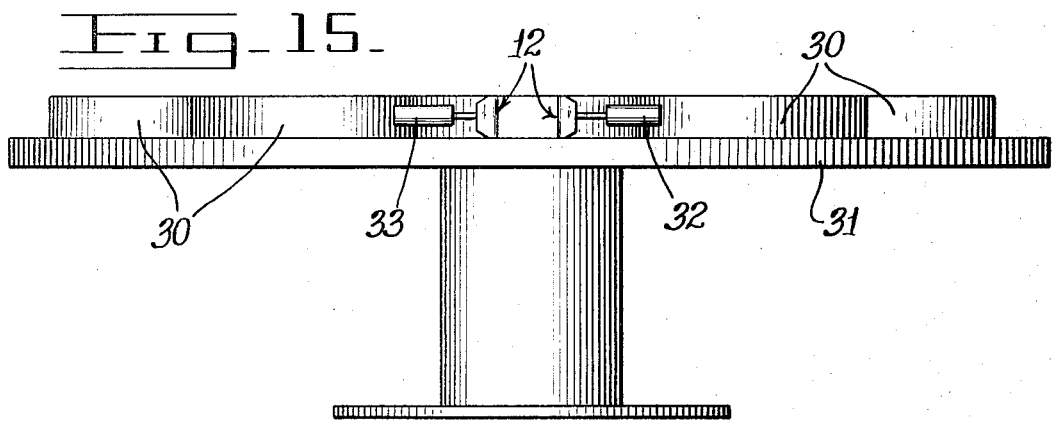
Fig_15_

BAND BRAKE AND METHOD FOR MAKING SAME

BACKGROUND OF THE INVENTION

Conventional band brakes comprise a flexible, discontinuous band having an anchor secured to each free end thereof for engagement by an operator-controlled linkage system for selectively actuating the band brake. The anchors, each having a gripping groove formed thereon, are normally forged and welded to the band.

SUMMARY OF THIS INVENTION

An object of this invention is to provide an economical band brake which exhibits a high degree of structural integrity and a method for expeditiously and efficiently making same. The band brake comprises a one-piece flexible band having an anchor integrally formed on each free end thereof by reverse folding an integral extension of the band into overlying relationship therewith. A gripping groove is defined on each anchor to face away from the gripping groove formed on the other one of the anchors. The method of this invention comprises stretch-forming the band to its desired diameter and securing a brake lining to inner surface portions of the band, preferably by adhesive bonding.

BRIEF DESCRIPTION OF THE DRAWINGS

Other objects of the invention will become apparent from the following description and accompanying drawings wherein:

FIG. 4 is a flow diagram schematically illustrating method steps employed in the making of the band brake;

FIGS. 5-12 are various enlarged views of a flexible band of the band brake, sequentially illustrating the formation of an anchor thereon;

FIGS. 14 and 15 are top plan and front elevational views schematically illustrating the application of a segmented brake lining to the flexible band.

DETAILED DESCRIPTION

Figure 1:
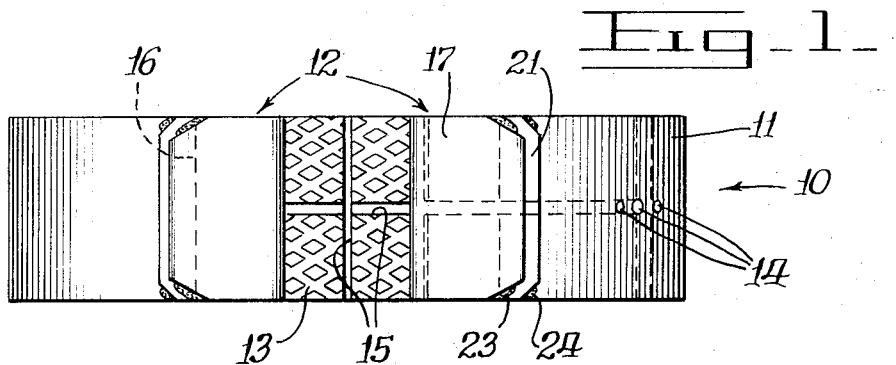
FIG. 1 is a top plan view of a band brake embodying this invention.
Figure 2:
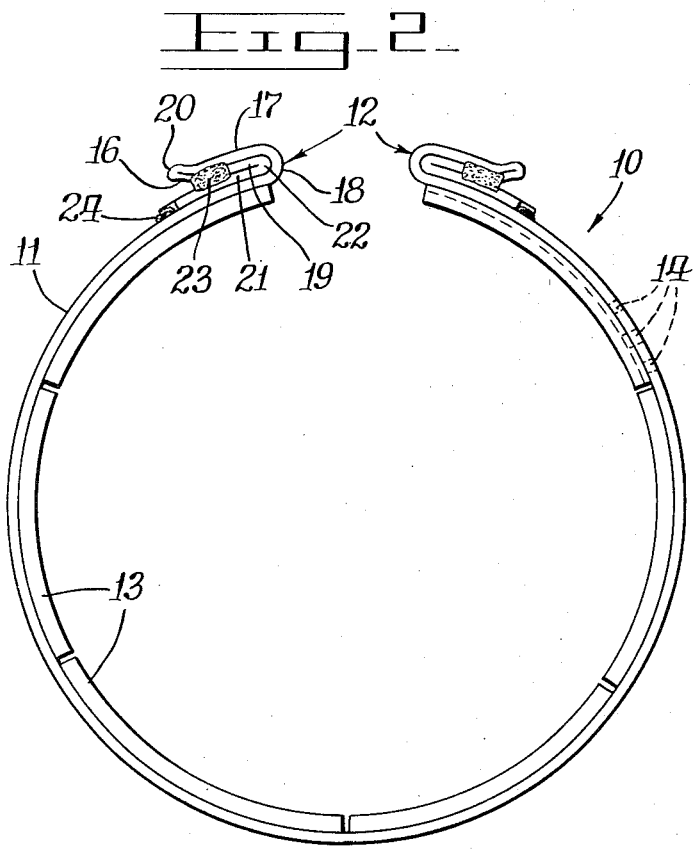
FIGS. 2 and 3 are front and side elevational views of the brake band, respectively.
Figure 3:
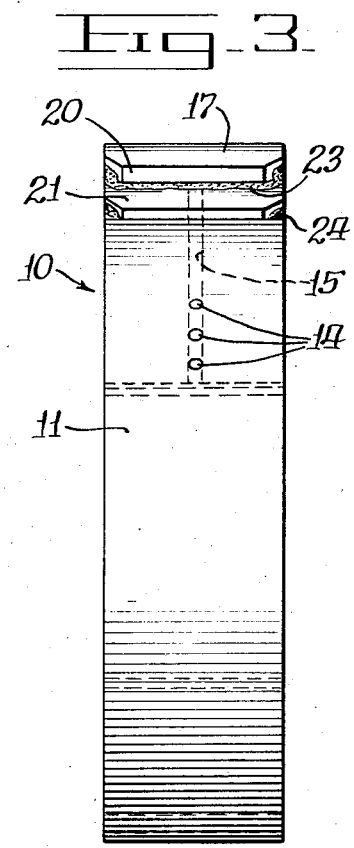

FIGS. 1-3 illustrate an annular band brake 10 comprising a one-piece, flexible steel band 11 having an anchor 12 integrally formed as an extension on each free end thereof. The anchors are adapted for operative connection to an operator-controlled linkage system (not shown) for selectively drawing the anchors towards each other for brake actuation purposes. A suitably composed brake lining means, such as segmented pads 13, are secured to inner surface portions of the band to engage a brake drum (not shown) to effect the braking function in a conventional manner. A plurality of ports 14 may be formed through the band to communicate lubricating oil to passage means, such as grooves 15 defined circumferentially and transversely between the pads, for cooling purposes.

Each anchor 12 comprises an integral extension of the band which is reverse folded into overlying relationship with the band to define a gripping groove 16 thereon which faces away from the gripping groove formed on the other one of the anchors. In the illustrated embodiment of this invention, the extension consecutively comprises an outer portion 17 connected directly to the band by a first fold 18, a first inner portion 19 connected directly to outer portion 17 by a second fold 20 to underlie the outer portion, and a second inner portion 21 connected directly to the first inner portion by a third fold 22 to be disposed between the first inner portion and the band. Gripping grooves 16 are thus each formed as a concave recess between first and second inner portions 19 and 21 and the folded portions are preferably secured together and to the band by first and second welds 23 and 24, respectively.

FIG. 4 is a flow diagram schematically illustrating method steps utilized for forming anchors 12 on each end of band brake 10 and should be viewed in conjunction with FIGS. 5-12 which illustrate the formed anchors in clearer detail. As shown in FIGS. 4(a), 4(b) and 5-7, band 11 initially comprises a flat steel strip which then has transversely disposed notches 25 formed on edges thereof, along with chamfered ends 26. FIGS. 4(c) and 8 illustrate the reverse folding of an integral end of the blank at notches 25 to form the above-described second fold 20 which is then crimped downwardly, as shown in FIGS. 4(d) and 9. As shown in FIGS. 4(e) and 10, the end is then again reverse folded to form superimposed outer portion 17 and first and second inner portions 19 and 21, consecutively connected to band 11 and to each other by folds 18, 20 and 22.

Figure 11:
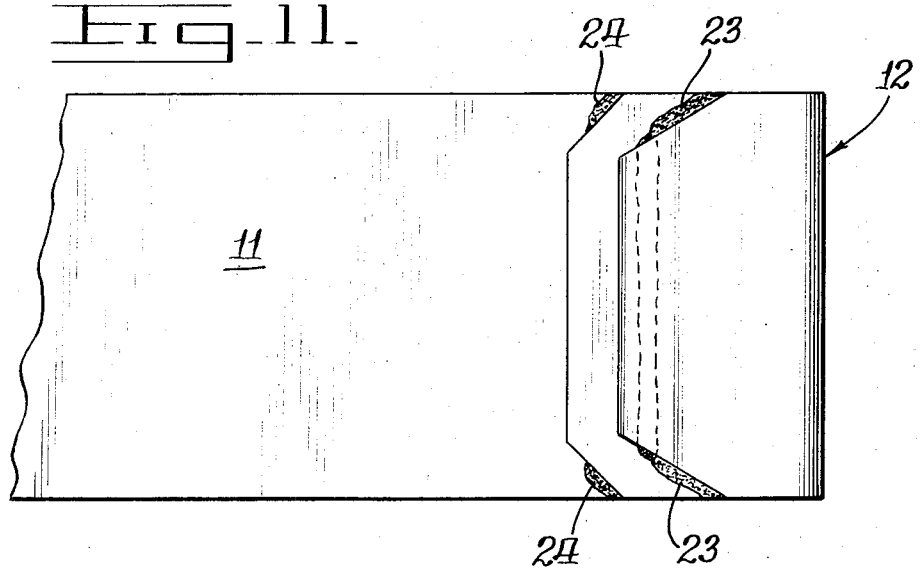
Figure 12:
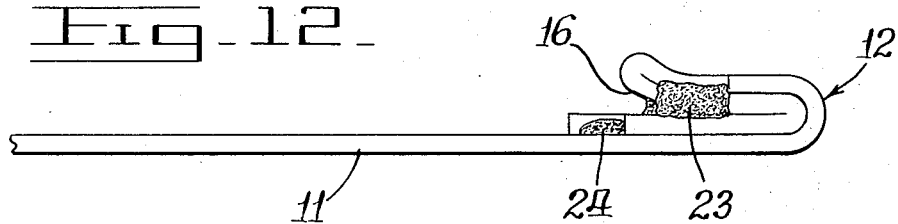

As shown in FIG. 4(f), the outer and inner portions are secured together by surface hardened weld bead 23 which extends at least substantially across a transverse width of the band and which is machined, as shown in FIGS. 4(g), 11 and 12, to define substantially smooth and concave bottom portion of gripping groove 16. In addition, surface hardened weld beads 24 are applied at chamfers 26 to provide means securing second outer portion 21 to band 11. The partially formed band, still in strip form, is then subjected to a chemical cleaning process, as shown in FIG. 4(h), to remove heat scales formed thereon during the previous operations.

Figure 13:
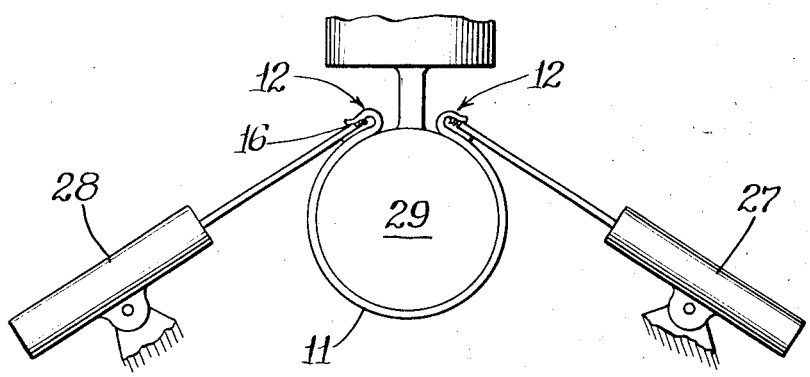
FIG. 13 schematically illustrates the stretch forming of the flexible band to its desired diameter.

As shown in FIGS. 4(i) and 13, gripping grooves 16 are suitably engaged by the rod ends of double acting hydraulic cylinders 27 and 28 to stretch form the strip into a flexible band of predetermined diameter, about a circular die 29. Such stretch forming preferably stretches the band beyond its elastic limit and may occur, if so desired, prior to the application of weld beads 24 thereto. Lubricating ports 14 are then formed through the band, as illustrated in FIG. 4(j).

Referring to FIGS. 4(k), 14 and 15, segmented brake linings 13 are then secured to inner surface portions of band 11. The brake linings may be secured to the band by a suitable adhesive, such as an epoxy resin, by first mounting the brake band on a die 30, secured on a turntable 31. Brake lining pads 13, having the adhesive suitably preapplied thereto, are then mounted between the band and the die and compressed together until the adhesive has cured, under the holding force of double-acting hydraulic cylinders 32 and 33. Alternatively, the brake linings may be riveted to the band. In the riveting application, suitably spaced rivet receiving holes could be die punched through the band, simultaneously with the notch forming method step illustrated in FIG. 4(b), for example,

What is claimed is:

1. An annular band brake comprising a one-piece flexible band having two free ends with an anchor integrally formed from the band on each free end thereof, each anchor comprising an integral extension of said band which is a double reverse fold disposed in overlying relationship with respect to said band to define a gripping groove thereon which faces away from the gripping groove formed on the other one of said anchors, each of said extensions consecutively comprising an outer portion connected directly to said band by a first fold, a first inner portion connected directly to said outer portion by a second fold and underlying and contacting the same, and a second inner portion connected directly to said first inner portion by a third fold and underlying and contacting the same being disposed between said first inner portion and said band, said third fold being nested within said first fold and contacting throughout its width and length said gripping groove comprising a concave recess formed between said first and second inner portions, means securing said outer portion and said first and second inner portions together, and said securing means comprising a weld bead extending at least substantially across the transverse width of said portions to define a bottom portion of said gripping groove to engage an actuator rod adapted to extend therein.

2. The band brake of claim 1 further comprising means securing said second inner portion to said band.

3. The band brake of claim 1 further comprising brake lining means secured to inner surface portions of said band.

4. The band brake of claim 3 wherein said brake lining means comprises a plurality of segmented pads adhesively secured to the inner surface portions of said band.

5. The band brake of claim 4 further comprising ports formed through said band to communicate with passage means formed between said pads for cooling said band brake upon passage of lubricating oil therethrough.

* * * * *